(12) United States Patent  (10) Patent No.: US 9,166,885 B2
Santoro et al.  (45) Date of Patent: Oct. 20, 2015

(54) LAWFUL IDENTIFICATION OF UNKNOWN TERMINALS

(75) Inventors: Pompeo Santoro, Baronissi (IT); Rossana Tomeo, Salerno (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 857 days.

(21) Appl. No.: 13/140,100

(22) PCT Filed: Dec. 19, 2008

(86) PCT No.: PCT/SE2008/051524
§ 371 (c)(1),
(2), (4) Date: Aug. 8, 2011

(87) PCT Pub. No.: WO2010/071524
PCT Pub. Date: Jun. 24, 2010

(65) Prior Publication Data
US 2011/0287781 A1   Nov. 24, 2011

(51) Int. Cl.
*H04W 4/02* (2009.01)
*H04W 24/00* (2009.01)
*H04L 12/24* (2006.01)
*H04L 29/06* (2006.01)
(Continued)

(52) U.S. Cl.
CPC .............. *H04L 41/12* (2013.01); *H04L 63/102* (2013.01); *H04L 63/30* (2013.01); *H04M 3/2281* (2013.01); *H04M 3/42348* (2013.01); *H04M 2201/18* (2013.01); *H04M 2207/18* (2013.01); *H04W 8/08* (2013.01)

(58) Field of Classification Search
CPC ......... H04L 63/30; H04L 63/00; H04L 67/18; H04W 12/02; H04W 64/00; H04W 24/00; H04W 4/02; H04W 4/025; H04W 4/028; H04M 3/2281; H04M 2201/18; H04M 3/42348; H04M 3/2218; H04M 3/42059
USPC ............................................... 455/456.1–457
See application file for complete search history.

(56) References Cited

U.S. PATENT DOCUMENTS 6,507,802 B1 * 1/2003 Payton et al. ................ 702/150
8,897,809 B2 * 11/2014 Madigan et al. .......... 455/456.3
(Continued)

FOREIGN PATENT DOCUMENTS

CN    1852353 A    10/2006
EP    1 460 876 A2    9/2004
(Continued)

OTHER PUBLICATIONS

International Preliminary Report on Patentability, PCT International Application No. PCT/SE2008/051524, Dec. 19, 2008 (14 pages).
(Continued)

*Primary Examiner* — Matthew Sams
(74) *Attorney, Agent, or Firm* — Patent Portfolio Builders, PLLC

(57) ABSTRACT

The present invention relates to methods and arrangements to establish an identity of a target T. The method comprises the following steps:—Collecting geographical location points A, B, C, D indicating presence of the target.—Interrogating at least one mobile network to fetch lists of identities of users located in defined areas C1-C3, each area covering a collected geographical location point.—Crosschecking between the fetched lists.—Identifying a single identity that is common to the fetched lists.

14 Claims, 5 Drawing Sheets

(51) Int. Cl.
*H04M 3/22* (2006.01)
*H04M 3/42* (2006.01)
*H04W 8/08* (2009.01)

(56) References Cited

U.S. PATENT DOCUMENTS

| | | | | |
|---|---|---|---|---|
| 2003/0096621 | A1* | 5/2003 | Jana et al. | 455/456 |
| 2007/0123268 | A1* | 5/2007 | Parata | 455/456.1 |
| 2008/0280609 | A1* | 11/2008 | Imbimbo et al. | 455/435.1 |
| 2010/0130231 | A1* | 5/2010 | Fiorillo et al. | 455/456.3 |
| 2012/0231819 | A1* | 9/2012 | Madigan et al. | 455/456.3 |

FOREIGN PATENT DOCUMENTS

| | | |
|---|---|---|
| WO | WO 0160098 A1 * | 8/2001 |
| WO | WO 0161588 A1 * | 8/2001 |
| WO | WO 2006/011165 A1 | 2/2006 |
| WO | WO 2006/065190 A1 | 6/2006 |
| WO | WO 2007/073252 A1 | 6/2007 |
| WO | WO 2007073252 A1 * | 6/2007 |
| WO | WO 2007/097667 A1 | 8/2007 |

OTHER PUBLICATIONS

Written Opinion of the International Searching Authority mailed on Aug. 19, 2009 for International Application No. PCT/SE2008/051524.

European Search Report Corresponding to European Application No. 08878988.8; Dated: Oct. 16, 2012; 7 Pages.

Chinese Office Action Corresponding to Chinese Application No. 200880132450.9; Dated: Jun. 30, 2014; 8 Pages.

Chinese Search Report Corresponding to Chinese Application No. 200880132450.9; Dated: Jun. 25, 2014; 9 Pages.

ETSI TS 102 232-4 V3.2.2 (Jul. 2014) Technical Specification, Lawful Interception (LI); Handover interface and Service-Specific Specific Details (SSD) for IP Delivery; Part 4: Service-Specific Details for Layer 2 Services, 33 pages.

ETSI ES 201 671 V3,1,1 (May 2007) Lawful Interception (LI); Handover Interface for the Lawful Interception of Telecommunications Traffic, 124 pages ETSI TS 102 232-1 V3.8.1 (Oct. 2014) Technical Specification, Lawful Interception (LI); Handover interface and Service-Specific Details (SSD) for IP Delivery; Part 1: Handover Specification for IP Delivery, 63 pages.

ETSI TS 102 232-2 V3.8.1 (Oct. 2014) Technical Specification, Lawful Interception (LI); Handover Interface and Service-Specific Details (SSD) for IP Delivery; Part 2: Service-Specific Details for Messaging Services, 61 pages.

ETSI TS 102 232-2 V3.3.1 (Oct. 2013) Technical Specification, Lawful Interception (LI); Handover Interface and Service-Specific Details (SSD) for IP Delivery; Part: 3 Service-Specific Details for Internet Access Services, 51 pages.

Joint Standard, Lawfully Authorized Electronic Surveillance, ANSI/J-STD-025-B (Upgrade/Revision of J-STD-025-B), Aug. 2006, Jointly Developed By: Telecommunicationa Industry Association and Alliance for Telecommunications Industry Solutions, 266 pages.

ETSI TS 102 232-5 V3.4.1 (Oct. 2014) Technical Specification, Lawful Interception (LI); Handover Interface and Service-Specific Details (SSD) for IP Delivery; Part 5 Service-Specific Details for IP Multimedia Services, 27 pages.

ETSI TS 102 232-6 V3.3.1 (Mar. 2014) Technical Specification, Lawful Interception (LI); Handover Interface and Service-Specific Details (SSD) for IP Delivery; Part 6: Service-Specific Details for PSTN/ISDN Services, 15 pages.

ETSI TS 102 232-7 V3.2.1 (Jul. 2013) Technical Specification, Lawful Interception(LI); Handover Interface and Service-Specific Details (SSD) for IP Delivery; Part 7: Service-Specific Details for Mobile Services, 14 pages.

ETSI TS 133 106 V12.5.0 (Jan. 2015) Technical Specification, Universal Mobile Telecommunications System (UMTS); LTE; 3G Security; Lawful Interceptin Requirements (3GPP TS 33.106 Version 12.5.0 Release 12), 20 pages.

ETSI TS 133 107 V12.10.0 (Apr. 2014) Technical Specification, Universal Mobile Telecommunications System (UMTS); LTE; 3G Security; Lawful Interception Architecture and Functions (3GPP TS 33.107 Version 12.10.0 Release 12), 231 pages ETSI TS 133 108 V12.8.0 (Apr. 2015) Technical Specification, Universal Mobile Telecommunications System (UMTS); LTE; 3G Security; Handover Interface for Lawful Interception (LI) (3GPP TS 33.108 Version 12.8.0 Release 12), 254 pages.

* cited by examiner

LAWFUL IDENTIFICATION OF UNKNOWN TERMINALS

CROSS REFERENCE TO RELATED APPLICATION

This application is a 35 U.S.C. §371 national stage application of PCT International Application No. PCT/SE2008/051524, filed on 19 Dec. 2008, the disclosure and content of which are incorporated by reference herein in its entirety. The above-referenced PCT International Application was published in the English language as International Publication No. WO 2010/071524 A1 on 24 Jun. 2010.

TECHNICAL FIELD

The present invention relates to methods and arrangements for establishing an identity of a target.

BACKGROUND

Lawful Interception and Data Retention of communications can be made based on knowledge of the identity of a party responsible for transmitting or receiving the communication. For example if a mobile telephone number of a criminal suspect is known, it is possible to intercept or retain electronic communication sent from or received by the criminal suspect's mobile telephone. In governments around the world, various law enforcement agencies may have the right to authorize this interception/retention in their respective jurisdictions.

FIG. 1A is part of the prior art and discloses an Intercept Mediation and Delivery Unit IMDU, also called Intercept Unit. The IMDU is a solution for monitoring of Interception Related Information IRI and Content of Communication CC for the same target. The different parts used for interception are disclosed in current Lawful Interception standards (see 3GPP TS 33.108 and 3GPP TS 33.107-Release 7). A Law Enforcement Monitoring Facility LEMF is connected to three Mediation Functions MF, MF2 and MF3 respectively for ADMF, DF2, DF3 i.e. an Administration Function ADMF and two Delivery Functions DF2 and DF3. The Administration Function and the Delivery Functions are each one connected to the LEMF via standardized handover interfaces HI1-HI3, and connected via interfaces X1-X3 to an Intercepting Control Element ICE in a telecommunication system. Together with the delivery functions, the ADMF is used to hide from ICEs that there might be multiple activations by different Law Enforcement Agencies. Messages REQ sent from LEMF to ADMF via HI1 and from the ADMF to the network via the X1_1 interface comprise identities of a target that is to be monitored. The Delivery Function DF2 receives Intercept Related Information IRI from the network via the X2 interface. DF2 is used to distribute the IRI to relevant Law Enforcement Agencies LEAs via the HI2 interface. The Delivery Function DF3 receives Content of Communication CC, i.e. speech and data, on X3 from the ICE. Requests are also sent from the ADMF to the Mediation Function MF2 in the DF2 on an interface X1_2 and to the Mediation Function MF3 in the DF3 on an interface X1_3. The requests sent on X1_3 are used for activation of Content of Communication, and to specify detailed handling options for intercepted CC. In Circuit Switching, DF3 is responsible for call control signaling and bearer transport for an intercepted product. Intercept Related Information IRI, received by DF2 is triggered by Events that in Circuit Switching domain are either call related or non-call related. In Packet Switching domain the events are session related or session unrelated. In Packet Switching domain the events are session related or session unrelated.

While Lawful Interception is a real-time exercise, data from the past is used when Data Retention is practiced. FIG. 1B belongs to the prior art and shows the Handover Interfaces between a Data Retention System DRS (see ETSI DTS/LI-00033 V0.8.1 and ETSI DTS/LI-0039) at a Communication Service Provider CSP, and a Requesting Authority RA. The figure shows an Administration Function AdmF used to handle and forward requests from/to the RA. A Mediation and Delivery function MF/DF is used to mediate and deliver requested information. Storage is used to collect and retain all possible data from external the data bases. The generic Handover Interface adopts a two port structure such that administrative request/response information and Retained Data Information are logically separated. The Handover Interface port 1 HIA transports various kinds of administrative, request and response information from/to the Requesting Authority and the organization at the CSP which is responsible for Retained Data matters. The HIA interface may be crossing borders between countries. This possibility is subject to corresponding national law and/or international agreements. The Handover Interface port 2 HIB transports the retained data information from the CSP, to the Requesting Authority. The individual retained data parameters have to be sent to the Requesting Authority at least once of available). The HIB interface may be crossing borders between countries. This possibility is subject to corresponding national law and/or international agreements.

Lawful Interception and Data Retention needs specific target information to be activated on a suspect. Law Enforcement Authorities receive the mandate to intercept a certain person usually from a judge. Their first task is to discover the target identities that they can use to activate LI. If the user has a subscription with a telecom operator it is rather straightforward to ask the operator for this information and then activate the interception on the discovered identities. Valid for both Lawful Interception and Data Retention is that in most cases criminals try to keep their "identities" secret by for example using prepaid anonymous subscriptions to mobile networks, possibly buying the SIM cards abroad in countries where it is not mandatory to disclose own identity to buy a prepaid SIM or by using SIMS registered to someone else. The problem at hand is thus how to discover efficiently the target identities of a well known person subject of lawful interception and or data retention due to a judicial warrant.

SUMMARY

The present invention relates to a problem how to identify target identities of a target that is subject of lawful monitoring due to a judicial warrant, which target identities are necessary to perform Lawful Interception and/or Data Retention.

This problem and others are solved by the invention by mechanisms that collect trails left behind by the target and that make a crosscheck between the trails until a single specific target identity in a mobile network is identified.

More in detail, by tracing a number of geographical locations where the target has been present and collecting from a mobile network all mobile subscribers known to the network to be present in each location, a single subscriber can be identified as the only one present in all locations at collection time. The method comprises the following steps:

Geographical location points indicating presence of the target are collected.

At least one mobile network is interrogated and lists of identities of users located in defined areas, each area covering at least one of the collected geographical location points, are fetched.

A crosscheck between the fetched lists is performed.

A single identity that is common to the fetched lists is identified.

In one aspect of the invention a Lawful Interception embodiment is disclosed. Real time data is collected from geographical location points and lists of identities are fetched from mobile networks.

In another aspect of the invention a Data Retention embodiment is disclosed. Data collected from geographical location points and lists of identities fetched from mobile networks are stored for later usage.

An object of the invention is to enhance the Lawful Interception and Data Retention solution in order to ensure efficiently discovering of target identities of a well known target that is subject of lawful monitoring due to a judicial warrant. This object and others are achieved by methods, arrangements, nodes, systems and articles of manufacture.

An advantage with the invention is that an agency will be able to identify for example a phone number or mobile identity of a suspect in an automatic way when other specific information of the individual is known. In these way commonly used techniques, such as using for example anonymous prepaid foreign subscriptions to elude monitoring can be neutralized.

The invention will now be described more in detail with the aid of preferred embodiments in connection with the enclosed drawings.

DETAILED DESCRIPTION

Figure 2:
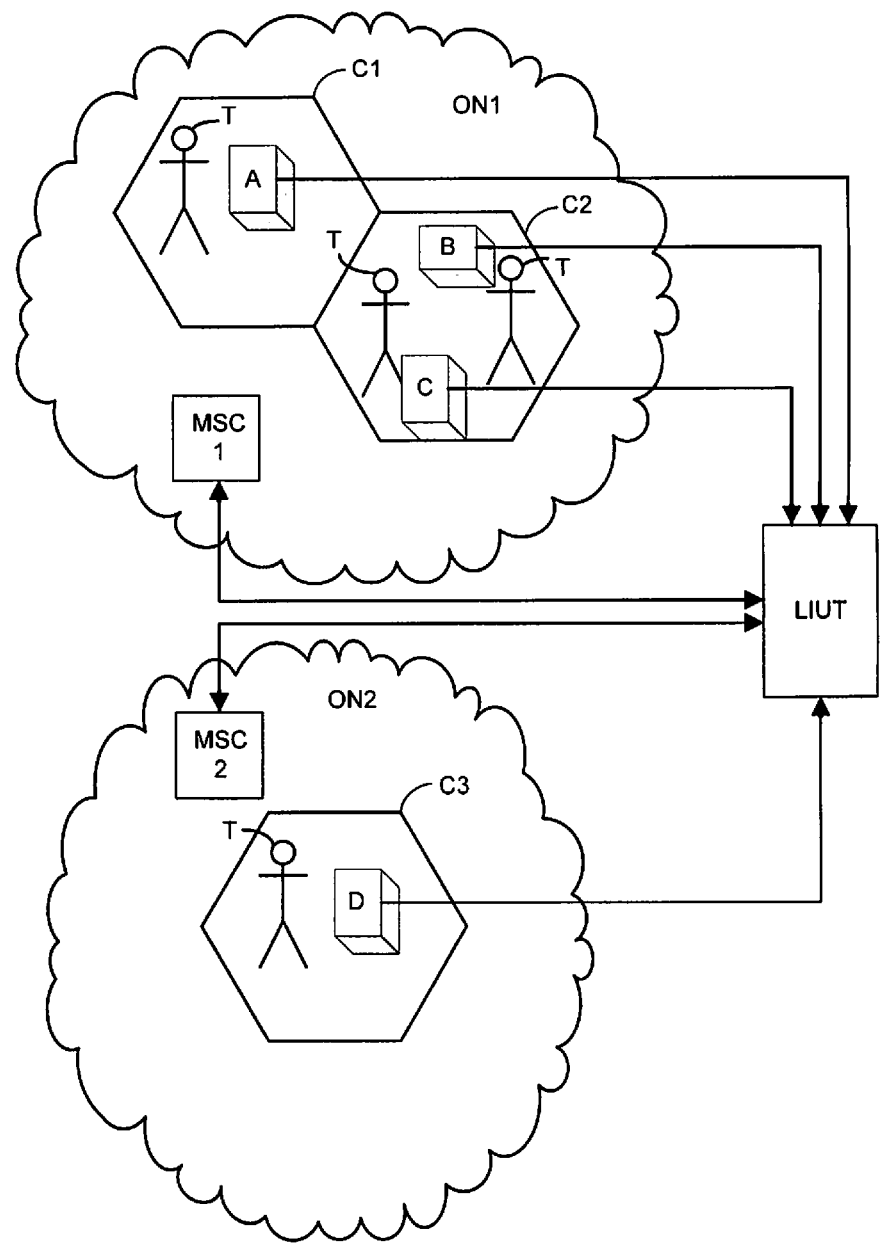
FIG. 2 is a block schematic illustration disclosing a target which at different times is present in different locations within the operator networks. A Lawful Interception Unknown Terminal LIUT is attached to the operator networks.

FIG. 2 discloses a telecommunication system. The system comprises in this example two Operator Networks ON1 and ON2. A target T, i.e. a subject under interception, can be seen in FIG. 2. The target is present in four different places in this example. In the figure three different access entities A, B and C can be seen within the first operator Network ON1. The first access entity A is an ATM System, the second entity B is a Credit Card System and the third entity C is a highway automatic toll payment system. The first Operator Network ON1 comprises two cell areas C1 and C2. The first access entity A is located within the first cell area C1 and the second and third entities B and C are located within the second cell area C2. A Mobile Switching Centre MSC1 controls the cell areas C1 and C2. A Lawful Interception Unknown Terminal LIUT is disclosed in FIG. 2. LIUT has similar functionalities as the IMDU discussed in the BACKGROUND ART section of this application. The LIUT will be further explained below together with the first embodiment. The second operator network ON2 comprises a GPS mikrospy client D. The microspy client is a device attached at the target's car. The microspy client periodically reports the car's location to the LIUT. The second Operator Network ON2 comprises a cell area C3. The mikrospy client D is in the first embodiment located within the cell area C3. A Mobile Switching Centre MSC2 controls the cell area C3. The MSC1, MSC2, A, B, C and D are all able to communicate with the LIUT as can be seen in FIG. 2.

Figure 1A:
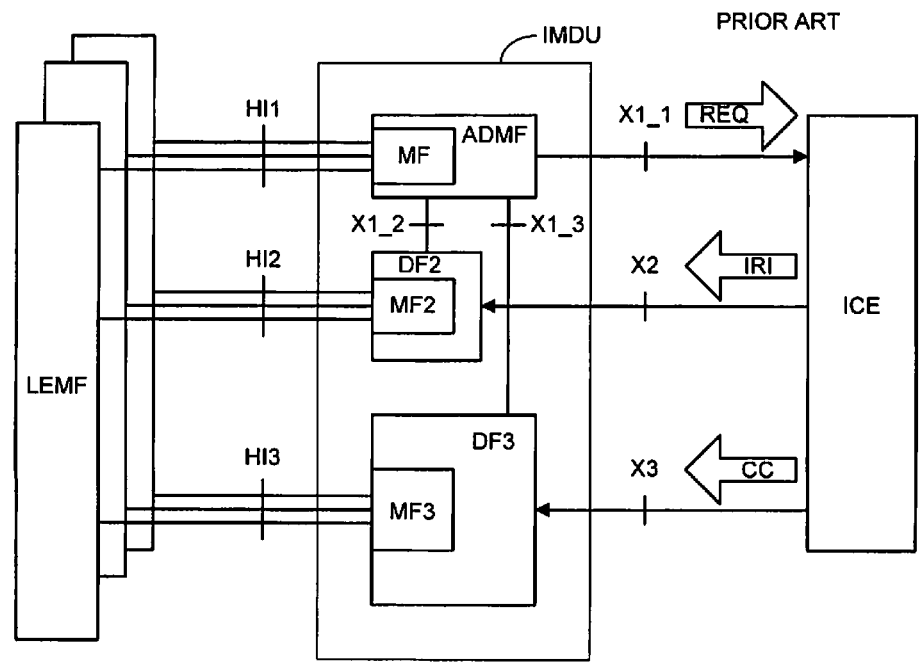
FIG. 1A is part of the prior art and discloses a block schematic illustration of an Intercept Mediation and Delivery Unit attached to an Intercepting Control Element.
Figure 1B:
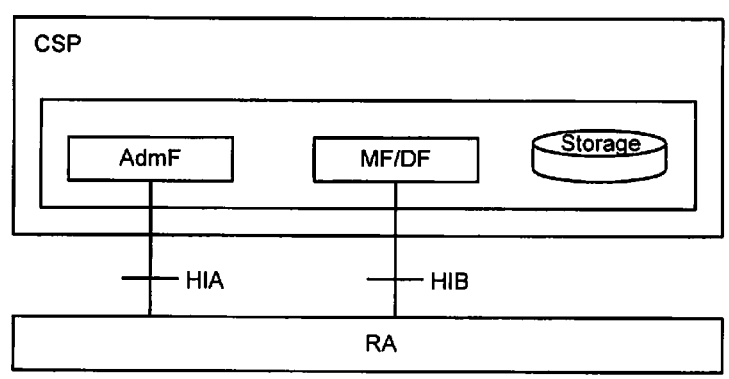
FIG. 1B is part of the prior art and discloses a block schematic illustration of a Data Retention System attached to a Requesting Authority.
Figure 3:
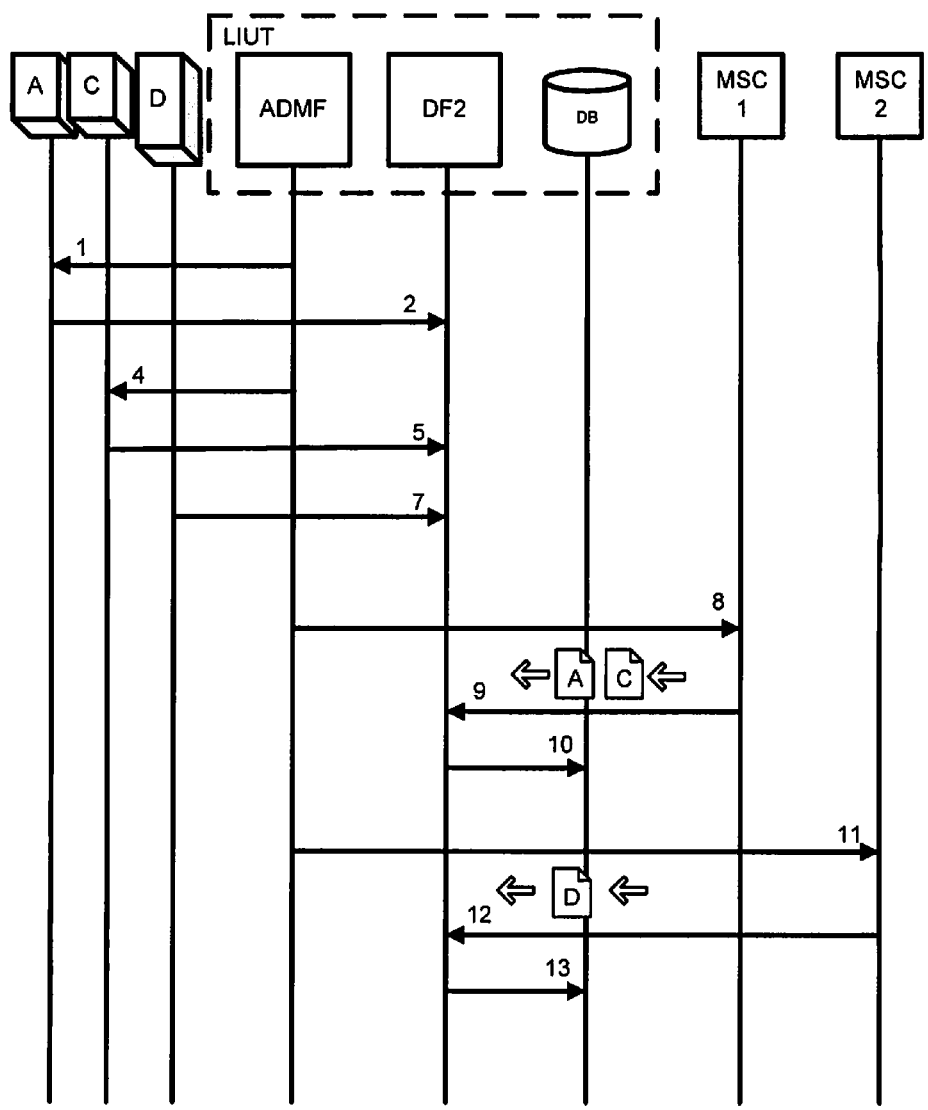
FIG. 3 discloses a signal sequence diagram representing collecting and handling of various data in a Lawful interception environment.

A method according to the first embodiment of the invention will now be explained together with FIG. 3. Signalling points A, C, D, LIUT, MSC1 and MSC2 have all been shown and briefly explained earlier in FIG. 2. The Lawful Interception Unknown Terminal LIUT is shown more in detail in FIG. 3. As mentioned, the LIUT has similar functionalities as the IMDU discussed in the BACKGROUND ART section of this application and the reference signs mentioned in the text below refer to the already explained FIG. 1A. In the LIUT, a Law Enforcement Monitoring Facility LEMF is connected to two Mediation Functions MF and MF2 respectively for ADMF and DF2. The Administration Function is connected to the LEMF via standardized handover interfaces HT1 and DF2 is connected to LEMF via HI2. The ADMF and DF2 are connected via interfaces X1 and X2 respectively to Intercepting Control Elements that in FIG. 3 are represented by A, B, C, MSC1 and MSC2. Messages are sent from LEMF to ADMF via the Ni1 interface and from the ADMF to A, B, C, MSC1 or MSC2 via the X1_1 interface. The Delivery Function DF2 receives Intercept Related Information IRI from A, B, C, MSC1 and MSC2 via the X2 interface. The LIUT comprises a data base DB wherein collected IRI data received to DF2 is stored. It is to be noted that DB as well can be located outside the LIUT. A prerequisite for the invention is that a subscriber is subject of lawful monitoring due to a judicial warrant. In this example a prerequisite is also that a requesting agency in control of the LEMF, has obtained information about the subscriber's bank account number and highway pay number. A further prerequisite in this example is also that the mikrospy client D has been attached to the subscriber's car. Of course, the above mentioned prerequisites are valid only in this particular example. The method according to the first embodiment comprises the following steps:

- The agency sends out 1, via the ADMF, object marking signals to selected ATM system entities where the target is expected to be present. In FIG. 3 only one object marking signal is shown. The object marking signal is sent 1 from ADMF to the first access entity A.
- The agency sends out 4 object marking signals to selected highway automatic toll payment systems where the target is expected to be present. In FIG. 3 only one object marking signal is shown. The object marking signal is sent 4 from ADMF to the third access entity C.
- The target T makes cash withdrawal from the ATM system A.
- A report location signal comprising the subscriber's bank account number, geographical location and a time stamp showing the time that the cash withdrawal was made is sent 2 from the first access entity A to the DF2.

The report location signal is forwarded from DF2 to the LEMF via the interface HI2. This step is not disclosed in FIG. 3.

The target T transports himself to another location by using his car and makes a payment using the highway automatic toll payment systems i.e. the third access entity C.

A report location signal comprising the subscriber's highway pay account number, geographical location and a time stamp showing the time that the payment was made is sent 5 from the third access entity C to the DF2.

The report location signal is forwarded from DF2 to the LEMF via the interface HI2. This step is not disclosed in FIG. 3.

All time when the target T moves by using his car, the microspy client attached at the target's car periodically reports the car's location to the LIUT. In this exemplified embodiment a report location signal comprising a geographical location and a time stamp is sent 7 from the GPS mikrospy client D to the DF2 when the target is located within cell area C3.

The report location signal is forwarded from DF2 to the LEMF via the interface HI2. This step is not disclosed in FIG. 3.

The LIUT triggered by the received report location signals now starts to interrogate the mobile networks ON1 and ON2 to fetch lists of subscribers (i.e. identities IMSI, MSISDN and IMEI) in the cells covering the reported locations. The LIUT server hereby need to have available the cell planning data from the different mobile networks, so that when having a geographical coordinate the LIUT understands which cells in the different mobile networks cover that area. Moreover the LIUT may reduce the number of interrogated MSCs if it knows which MSC serves which Cell thus focusing only on the MSC serving that specific identified cell. The method hereby comprises the following further steps:

The agency sends out 8 a CollectUsers signal to the Mobile Switching Centre that controls the cell areas C1 and C2 where the first access entity A and the third access entity C is located. The agency hereby requests information of all subscribers located in C1 during a time falling together with the time stamp received from the first access entity A. The agency also requests information of all subscribers located in C2 during a time falling together with the time stamp received from the third access entity C. The CollectUsers signal is sent 8 from ADMF to the MSC1.

A ReportUsers signal is sent 9 from the MSC1 to the DF2. The ReportUsers signal comprises a so called A-list with all subscribers present in C1 at the time specified by the first access entity A. The ReportUsers signal also comprises a so called C-list with all subscribers present in C2 at the time specified by the third access entity C. Lists are in FIG. 3 disclosed by listsymbols A and C.

The A-list and the C-list are forwarded 10 from DF2 to the data base DB.

The agency sends out 11 a CollectUsers signal to the Mobile Switching Centre that controls the cell areas C3 where the GPS mikrospy client D is located. The agency hereby requests information of all subscribers located in C3 during a time falling together with the time stamp received from the GPS mikrospy client D. The CollectUsers signal is sent 11 from ADMF to the MSC2.

A ReportUsers signal is sent 12 from the MSC2 to the DF2. The ReportUsers signal comprises a so called D-list with all subscribers present in C3 at the time earlier specified by the GPS mikrospy client D.

The D-list is forwarded 13 from DF2 to the data base DB.

The agency, via the LEMF now starts to perform a cross-checking between the three lists A-list, C-list and D-list stored in the database. In this example the LEMF finds one single identity common to the three lists and consequently the found single identity belong to target T.

As a variation to the example described above where electronic trails were sent in from the entities A, C or from the GPS mikrospy client D, instead a shadowing agent could have reported the targets presence with a geographical location together with a time stamp representing the time of collecting the presence information.

Figure 4:
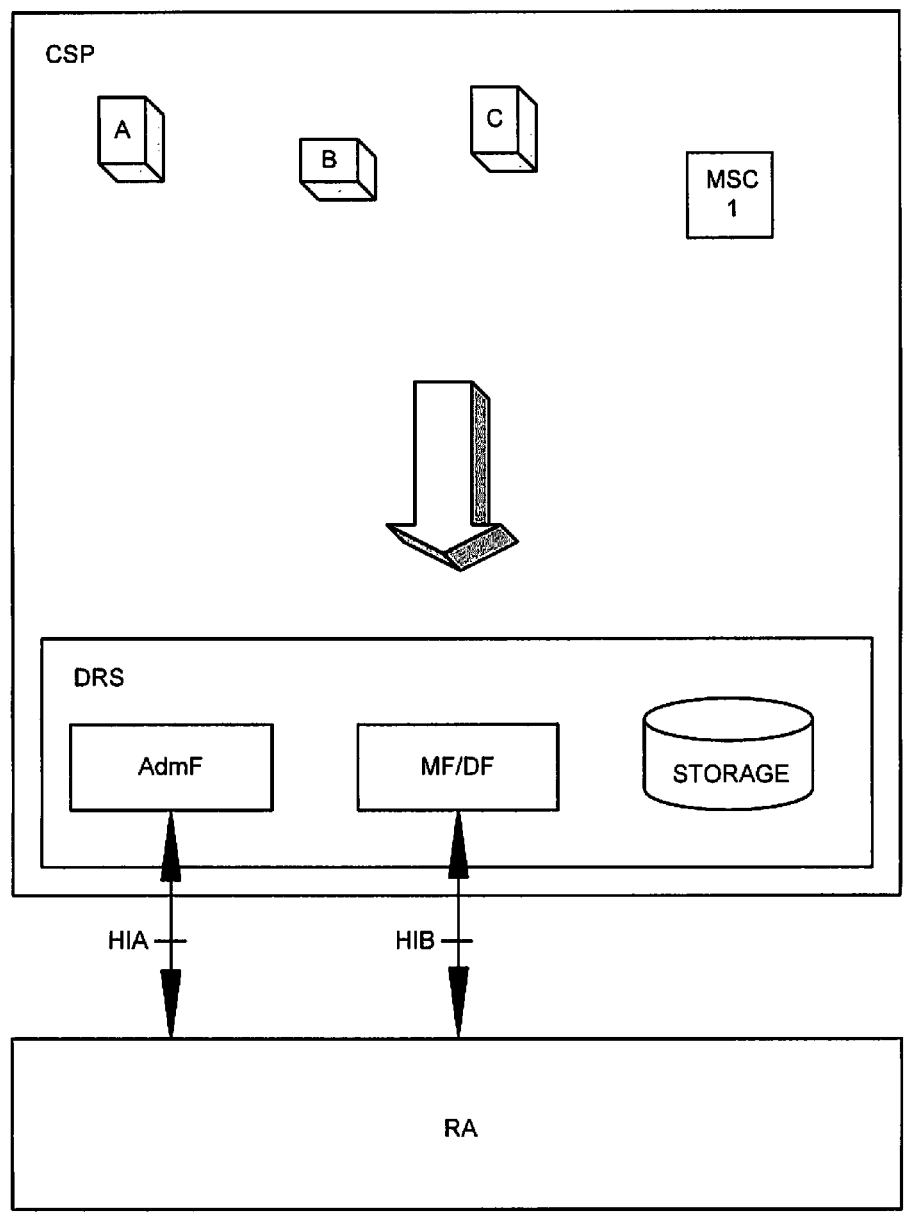
FIG. 4 is a block schematic illustration disclosing collection of data into a storage which data later is handled in a data retention environment.

FIG. 4 discloses in a second embodiment a Data Retention configuration. FIG. 4 shows the Handover Interfaces between a Data Retention System DRS at a Communication Service Provider CSP, and a Requesting Authority RA. This configuration including the AdmF, MF/DF, STORAGE, HIA, HIB and RA has been explained earlier in the background part of this application. The earlier explained entities A, B and C as well as the Mobile Switching Centre MSC1 are in this embodiment acting as data retention sources. The transportation of data from the data retention sources A-C and MSC1 to the MF/DF is schematically shown with a filled arrow in FIG. 4. Data records are transferred to the mediation function in the Data Retention System, and data fulfilling configured filtering criteria are mediated from MF/DF to the Storage. Updating of the Storage depends on the policy regulating the notifications with the user, session or operator related data, from the data retention sources towards the storage. Accordingly, the transportation of the data from the sources to the storage via the MF/DF is handled by an automatic data retention system. The automatic data retention system is part of the prior art and the transportation of data is a pre-requisite for this invention. In this example the following data transportations have been made:

Data comprising customer's bank account number, geographical location and a time stamp showing the time that cash withdrawals were made has been sent from the first access entity A to the STORAGE.

Data comprising customer's credit card number, geographical location and a time stamp showing the time credits were used has been sent from the first access entity B to the STORAGE.

Data comprising customer's highway pay account number, geographical location and a time stamp showing the time that payments were made has been sent from the third access entity C to the STORAGE.

Data is sent from the MSC1 to the STORAGE. The Data comprises information of all subscribers present in C1 at various times. The Data also comprises information of all subscribers present in C2 at various times.

Figure 5:
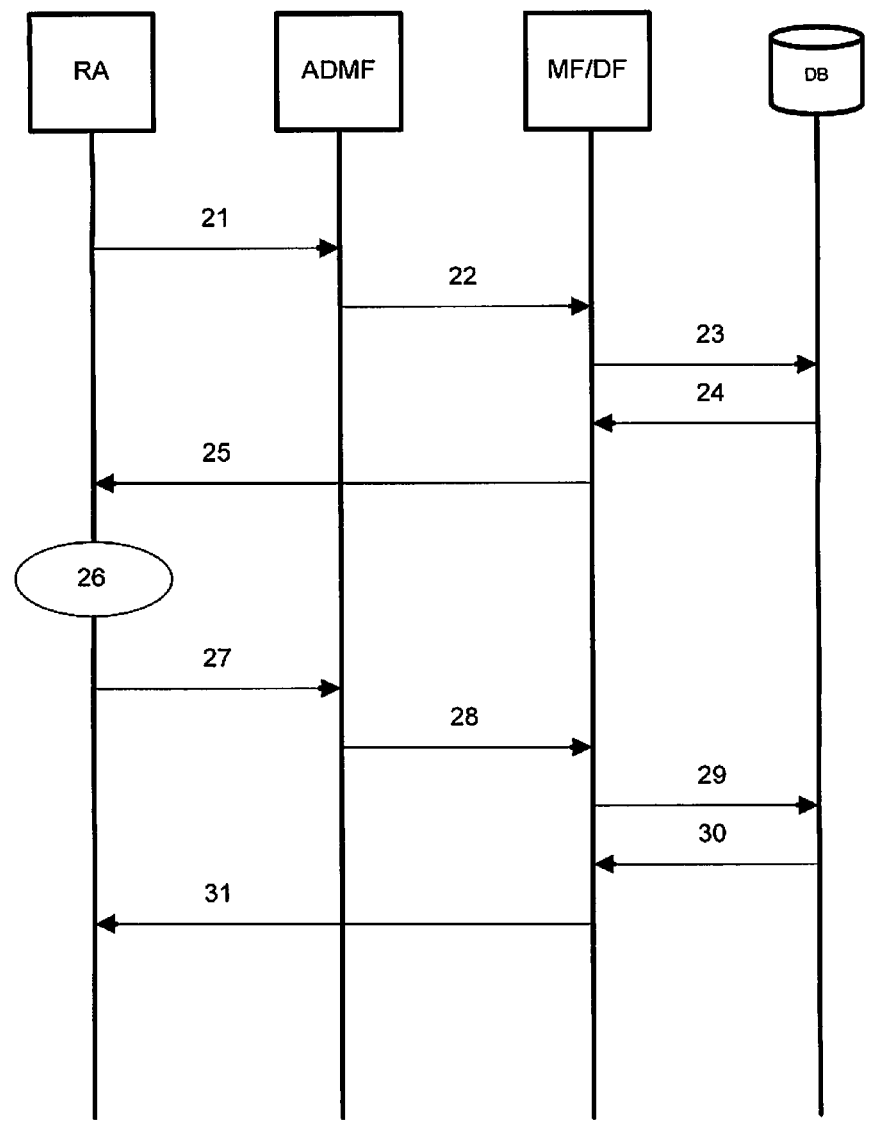
FIG. 5 discloses a signal sequence diagram representing collecting and handling of various data in a data retention environment.

The second embodiment of the invention will now be explained together with FIG. 5. The method in the second embodiment comprises according to the invention the following steps:

A monitoring request regarding access activities related to the use of the target's bank account number, credit card number and/or highway pay account number is determined by the requesting Authority RA and sent 21 to the AdmF via the interface HIA.

The AdmF informs 22 the Mediation and Delivery function MF/DF of the request.

The requested data regarding bank account number, credit card number and highway pay account number together with time stamps indicating the targets time of usage of bank account, credit card and highway pay account are found 23 and fetched 24 by the Mediation and Delivery function MF/DF from the Storage.

The found data is sent 25 as Message Data Records from the MF/DF on the interface HIB, to the RA.

The Requesting Agency analyses 26 received data from the data base DB. A monitoring request regarding information of all users located in C1 and C2 during a time falling together with the time stamps received from the data base DB is prepared by the Requesting Agency.

The agency RA sends out 27 the monitoring request to the AdmF via the interface HIA.

The AdmF informs 28 the Mediation and Delivery function MF/DF of the request.

The requested data regarding information of all users located in C1 and C2 during times falling together with the three time stamps received from the data base DB are found 29 and fetched 30 by the Mediation and Delivery function MF/DF from the Storage. Three different lists, a so called A-list, B-list and C-list are hereby forwarded from the data base to the Requesting Agency. The A-list comprises identities of subscribers located with cell C1 at the time the target made a bank account transaction. The B-list comprises identities of subscribers located with cell C2 at the time the target made a credit card transaction. The C-list comprises identities of subscribers located with cell C2 at the time the target made highway payment.

The lists are sent 31 as Message Data Records from the MF/DF on the interface HIB, to the RA.

The Requesting Agency may now start to perform a crosschecking between the three lists A-list, B-list and C-list. In this example the RA find one single identity common to the three list and consequently the found single identity must belong to target. By using the above method, the Requesting Authority has been able to connect the target that previously only was known by e.g. name, with the identity (for example IMSI, MSISDN and or IMEI) he is using at the moment. When aware of the target's identity, Lawful Interception and Data Retention can be performed.

The reciprocal signaling between the above different Data Retention entities is to be seen just as example. For example can the STORAGE be an integrated part of the MF/DF. In this example the criteria are sent from the RA but may also be communicated by an intermediary, such as a human operator who receives the command from an authorized source, and then inputs the criteria to the DRS.

A system that can be used to put the invention into practice is schematically shown in the FIGS. 1-5. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multifunction hardware. Processing functions may be implemented using a programmed microprocessor or general-purpose computer. The invention is not limited to the above described and in the drawings shown embodiments but can be modified within the scope of the enclosed claims.

The invention claimed is:

1. A method for establishing a subscriber identity of a target in a mobile network, comprising:
   receiving by a monitoring unit comprising a microprocessor, first and second geographical location points indicating presence of the target at the first and second geographical location points at respective first and second times;
   identifying one or more access points in the mobile network that serve first and second defined areas encompassing the first and second geographical location points, respectively;
   sending from the monitoring unit to the one or more access points, a request to monitor users present in the first and second defined areas;
   receiving by the monitoring unit, a first list of subscriber identities for users located in the first defined area at the first time;
   receiving by the monitoring unit, a second list of subscriber identities for users located in the second defined area at the second time;
   crosschecking by the monitoring unit between the first and second lists; and
   identifying by the monitoring unit from the first and second lists a subscriber identity that is common to the first and second lists.

2. A method according to claim 1, the method further comprising:
   receiving by a first one of the one or more access points a request to monitor users present in a defined area handled by the first access point;
   registering in the first access point identities of users present in the defined area; and
   sending from the first access point a list of the registered identities.

3. A method according to claim 2 wherein users located in the defined area are present in the area at a collecting time of the geographical location point corresponding to the defined area.

4. A method according to claim 1, further comprising:
   establishing that the subscriber identity is equal to the identity of the target.

5. A method according to claim 1 wherein the collecting and/or fetching of data is done from Intercepting Control Elements and/or Data Retention Sources.

6. A method according to claim 1, wherein at least one of the geographical location points is represented by an electronic trail from the target.

7. A method according to claim 1, wherein at least one of the geographical location points is reported by a shadowing agent.

8. A method according to claim 1, wherein at least one of the geographical location points is periodically reported.

9. A node configured to establish a subscriber identity of a target in a mobile network, the node comprising:
- means for collecting first and second geographical location points associated with the target at respective first and second times;
- means for sending a request to monitor users of the mobile network present in first and second defined areas corresponding to the first and second geographical location points at the respective first and second times;
- means for receiving first and second lists of user identities in the first and second defined areas at the respective first and second times;
- means for crosschecking between the first and second lists; and
- means for identifying a subscriber identity that is common to the first and second lists.

10. An arrangement for establishing a subscriber identity of a target in a mobile network, which arrangement comprises:
- means for receiving by a monitoring unit, first and second geographical location points associated with the target at the first and second geographical location points at respective first and second times;
- means for sending from the monitoring unit, a request to monitor users present in defined areas, each area covering at least one of the geographical location points;
- means for receiving by the monitoring unit, a first list of subscriber identities for users located in a first one of the defined areas at the first time;
- means for receiving by the monitoring unit, a second list of subscriber identities for users located in a second one of the defined areas at the second time;
- means for crosschecking between the first and second lists; and
- means for identifying from the first and second lists a single identity that is common to the first and second lists.

11. An arrangement according to claim 10, wherein the mobile network comprises an access point, which arrangement further comprises:
- means for receiving by the access point a request to monitor users present in a defined area handled by the access point;
- means for registering in the access point identities of users present in the defined area;
- means for sending from the access point a list of the registered identities.

12. An arrangement according to claim 10, which arrangement further comprises:
- means for establishing that the subscriber identity is equal to the identity of the target.

13. An arrangement according to claim 11, which arrangement is part of a Lawful Interception or Data Retention configuration.

14. An article of manufacture comprising a non-transitory program storage memory having computer readable program code embodied therein for establishing an identity of a target, the program code comprising:
- computer readable program code configured to collect first and second geographical location points indicating presence of the target at respective first and second times;
- computer readable program code configured to interrogate at least one mobile network to fetch first and second lists of identities of users located in first and second defined areas corresponding to respective ones of the first and second geographical location points at the respective first and second times;
- computer readable program code configured to crosscheck between the first and second lists; and
- computer readable program code configured to identify a subscriber identity that is common to the first and second lists.

* * * * *